United States Patent
Ohata et al.

(10) Patent No.: US 11,881,803 B2
(45) Date of Patent: Jan. 23, 2024

(54) CONTROL DEVICE FOR ELECTRIC VEHICLE

(71) Applicant: TOYOTA JIDOSHA KABUSHIKI KAISHA, Aichi-ken (JP)

(72) Inventors: Hirotsugu Ohata, Susono (JP); Kaoru Domon, Susono (JP); Naoyoshi Takamatsu, Shizuoka-ken (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 193 days.

(21) Appl. No.: 17/572,636

(22) Filed: Jan. 11, 2022

(65) Prior Publication Data
US 2022/0231630 A1    Jul. 21, 2022

(30) Foreign Application Priority Data

Jan. 15, 2021  (JP) .................... 2021-005214
Oct. 26, 2021  (JP) .................... 2021-174916

(51) Int. Cl.
*H02M 5/42*      (2006.01)
*H02P 29/50*     (2016.01)
*B60L 15/20*     (2006.01)
*B60L 53/20*     (2019.01)
*H02P 27/08*     (2006.01)

(52) U.S. Cl.
CPC .............. *H02P 29/50* (2016.02); *B60L 15/20* (2013.01); *B60L 53/20* (2019.02); *H02P 27/08* (2013.01)

(58) Field of Classification Search
CPC ........ H02P 29/50; H02P 27/08; H02P 27/085; H02P 27/02; B60L 15/20; B60L 53/20
See application file for complete search history.

(56) References Cited

U.S. PATENT DOCUMENTS

| 5,184,057 A * | 2/1993 | Sakai .................. H02M 5/4585 318/803 |
| 9,178,449 B2 | 11/2015 | Takamatsu et al. |
| 2006/0215429 A1* | 9/2006 | Oka ........................ H02P 21/22 363/97 |

FOREIGN PATENT DOCUMENTS

JP         5472475 B2    4/2014

* cited by examiner

*Primary Examiner* — Muhammad S Islam
(74) *Attorney, Agent, or Firm* — HAUPTMAN HAM, LLP

(57) ABSTRACT

A control device for an electric vehicle, includes: a DC power supply; a three-phase AC motor; an inverter that converts DC power supplied from the DC power supply into AC power and outputs the AC power to the three-phase AC motor; and a control unit that controls the inverter to control an input voltage to the three-phase AC motor. Further, when a parameter correlated with the input voltage includes a predetermined high frequency component, the control unit performs correction of adding a component for canceling out the high frequency component to the input voltage, and controls the three-phase AC motor based on the corrected input voltage.

9 Claims, 12 Drawing Sheets

US 11,881,803 B2

CONTROL DEVICE FOR ELECTRIC VEHICLE

CROSS-REFERENCE TO RELATED APPLICATION(S)

The present application claims priority to and incorporates by reference the entire contents of Japanese Patent Application Nos. 2021-005214 filed in Japan on Jan. 15, 2021 and 2021-174906 filed in Japan on Oct. 26, 2021.

BACKGROUND

The present disclosure relates to a control device.

Japanese Patent No. 5472475 discloses that in a drive system for a three-phase AC motor, correction control of adding an electric third order harmonic component to a voltage command of an inverter is executed in order to reduce power supply voltage ripple that occurs due to switching of the inverter.

SUMMARY

There is a need for providing a control device for an electric vehicle capable of reducing a component of a frequency that is multiple of an electric frequency.

According to an embodiment, a control device for an electric vehicle, includes: a DC power supply; a three-phase AC motor; an inverter that converts DC power supplied from the DC power supply into AC power and outputs the AC power to the three-phase AC motor; and a control unit that controls the inverter to control an input voltage to the three-phase AC motor. Further, when a parameter correlated with the input voltage includes a predetermined high frequency component, the control unit performs correction of adding a component for canceling out the high frequency component to the input voltage, and controls the three-phase AC motor based on the corrected input voltage.

DETAILED DESCRIPTION

With the configuration described in Japanese Patent No. 5472475, the ripple of the switching frequency component can be reduced by the countermeasure against the power supply voltage ripple, but the countermeasure against the power supply current ripple or the motor torque ripple is not considered, so that a component of a frequency that is multiple of an electric frequency is not reduced, and there is room for improvement.

Hereinafter, a control device for an electric vehicle according to an embodiment of the present disclosure will be specifically described with reference to the drawings. The present disclosure is not limited to the embodiment described below.

Figure 1:
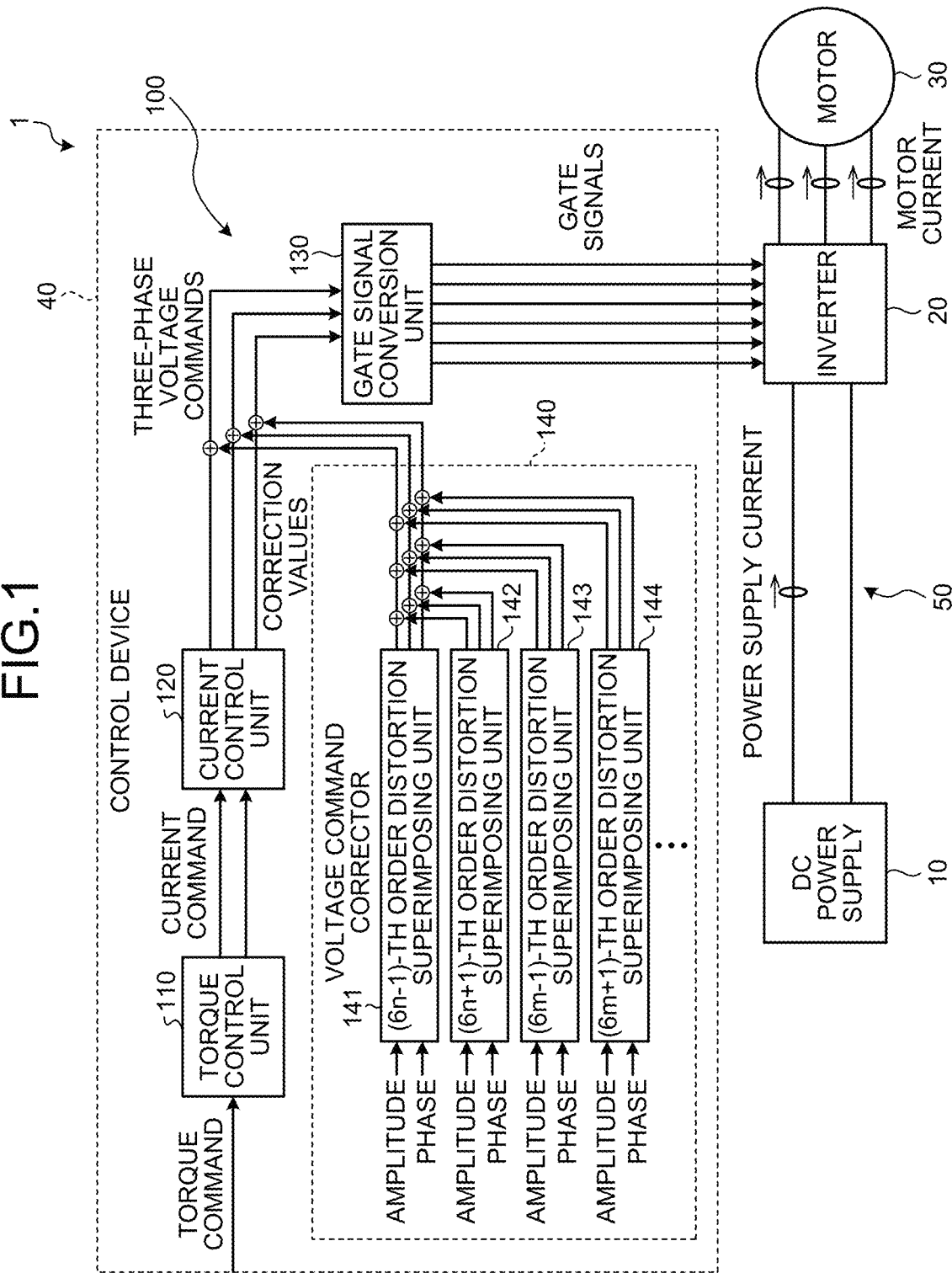
FIG. 1 is a system configuration diagram schematically illustrating a configuration of an electric vehicle according to an embodiment.

FIG. 1 is a system configuration diagram schematically illustrating a configuration of an electric vehicle according to an embodiment. As illustrated in FIG. 1, an electric vehicle 1 includes a DC power supply 10, an inverter 20, a motor 30, and a control device 40. The electric vehicle 1 is a vehicle using the motor 30 as a power source. A motor drive system 50 in the electric vehicle 1 includes a DC power supply 10, an inverter 20, and a motor 30.

The DC power supply 10 is a power storage device capable of storing electric power to be supplied to the motor 30. The DC power supply 10 includes a secondary battery such as a nickel hydrogen battery or a lithium ion battery.

The inverter 20 is a power conversion device that converts DC power supplied from the DC power supply 10 into AC power, and outputs the AC power obtained by the conversion to the motor 30. The inverter 20 is electrically connected to the control device 40, and a driving state of the inverter 20 is controlled by the control device 40. Specifically, the inverter 20 applies three-phase voltages to the motor 30 based on a three-phase voltage commands from the control device 40. That is, the inverter 20 is a three-phase inverter.

The inverter 20 includes a U-phase arm including a p-side switching element and an n-side switching element, a V-phase arm including a p-side switching element and an n-side switching element, and a W-phase arm including a p-side switching element and an n-side switching element. Each switching element of the inverter 20 includes, for example, an insulated gate bipolar transistor (IGBT) or the like. The phase arms of the inverter 20 are connected in parallel between a positive electrode line connected to the positive electrode of the DC power supply 10 and a negative electrode line connected to the negative electrode of the DC power supply 10. A diode that allows a current to flow from the emitter side to the collector side is connected to the switching element of the inverter 20. An intermediate point between the p-side switching element and the n-side switching element of each phase arm is connected to the corresponding phase coil (U-phase coil, V-phase coil, W-phase coil) of the motor 30.

The motor 30 is a power source for traveling of the electric vehicle 1, and is a three-phase AC motor generator in which a permanent magnet is embedded in a rotor. That is, the motor 30 is a three-phase AC motor. In the motor 30, a three-phase current flows in accordance with the applied three-phase voltage, and torque is generated. The motor 30 is mechanically connected to a drive wheel of the electric vehicle 1, and can generate torque for driving the electric vehicle 1. At the time of braking of the electric vehicle 1, the motor 30 can also perform regeneration (power generation) by receiving an input of kinetic energy of the electric vehicle 1. For example, when the electric vehicle 1 is a hybrid vehicle, the motor 30 is mechanically connected to the engine, and can perform regeneration by the power of the engine and assist the power of the engine.

In addition, when a three-phase voltage is applied to the motor 30 by the inverter 20, a motor current flows through each phase coil of the motor 30. The motor current includes a U-phase current Iu flowing through the U-phase coil of the motor 30, a V-phase current Iv flowing through the V-phase coil of the motor 30, and a W-phase current Iw flowing through the W-phase coil of the motor 30.

The control device 40 is an electronic control device that controls the operation of the motor drive system 50. The control device 40 includes a processor and a memory. The processor includes a central processing unit (CPU), a digital signal processor (DSP), a field-programmable gate array (FPGA), or the like. The memory is a main storage device, and includes a random access memory (RAM), a read only memory (ROM), and the like. The control device 40 loads a program stored in advance in the ROM into the work area of the memory, executes the program, and controls each of the components and the like through the execution of the program to implement functions that meet a predetermined purpose. Furthermore, the control device 40 can execute control (ripple reduction control) for reducing a ripple that occurs in the motor drive system 50 according to a control program stored in advance in the ROM.

Signals from various sensors are input to the control device 40. Examples of the signal input to the control device 40 include a rotational position of the motor 30 from a rotational position sensor that detects a rotational position of the motor 30, and a U-phase current Iu and a V-phase current Iv of the motor 30 from current sensors that detect U-phase and V-phase phase currents of the motor 30. Examples of the signal also include the voltage Vb of the DC power supply 10 from a voltage sensor that detects the voltage of the DC power supply 10, and the current (hereinafter, referred to as a power supply current) of the DC power supply 10 from a current sensor that detects the current of the DC power supply 10. Examples of the signal further include an ignition signal from an ignition switch, a shift position from a shift position sensor that detects an operation position of a shift lever, an accelerator opening from an accelerator pedal position sensor that detects a step-in amount of an accelerator pedal, a brake pedal position from a brake pedal position sensor that detects a step-in amount of a brake pedal, and a vehicle speed from a vehicle speed sensor. Then, the control device 40 executes various controls based on signals input from various sensors. For example, the control device 40 calculates the electrical angle and the rotation speed of the motor 30 based on the rotational position of the motor 30 input from the rotational position sensor.

In the electric vehicle 1 configured as described above, the control device 40 sets a required torque based on the accelerator opening and the vehicle speed. The control device 40 sets the required torque to a torque command Tr of the motor 30. Then, the control device 40 executes switching control of each switching element of the inverter 20 using the torque command Tr for the motor 30. When the switching control is performed, a switching signal to each switching element of the inverter 20 is output from the control device 40.

The control device 40 includes an inverter control unit 100 that controls the operation of the inverter 20. The inverter control unit 100 includes a torque control unit 110, a current control unit 120, a gate signal conversion unit 130, and a voltage command corrector 140. The inverter control unit 100 controls an input voltage to the motor 30.

The torque control unit 110 generates two-phase current commands (Idtg, Iqtg) based on the torque command Tr for the motor 30. The generated two-phase current commands Idtg and Iqtg are output from the torque control unit 110 to the current control unit 120.

The current control unit 120 generates three-phase voltage commands (Vu, Vv, Vw) based on the two-phase current commands Idtg and Iqtg input from the torque control unit 110. The generated three-phase voltage commands Vu, Vv, and Vw are output from the current control unit 120 to the gate signal conversion unit 130.

For example, the V-phase current Iv and the W-phase current Iw are input to the current control unit 120 as feedback information from the inverter 20. Based on the V-phase current Iv and the W-phase current Iw, the current control unit 120 converts the three-phase current values into two-phase current values including a d-axis current Id and a q-axis current Iq. The current control unit 120 generates two-phase voltage commands including a d-axis voltage Vd and a q-axis voltage Vq based on a difference between the converted two-phase current values (Id, Iq) and the two-phase current commands Idtg and Iqtg input from the torque control unit 110. Then, the current control unit 120 converts the generated two-phase voltage commands (Vd, Vq) into three-phase voltage commands (Vu, Vv, Vw). In this manner, the current control unit 120 generates three-phase voltage commands.

The gate signal conversion unit 130 generates a gate signal (switching signal) for each phase switching element of the inverter 20 based on the three-phase voltage commands Vu, Vv, and Vw input from the current control unit 120. The gate signal is a switching signal for switching the switching element between on and off. The generated switching signal of each phase is output to the inverter 20.

A known method (for example, PWM or the like) can be used to generate the switching signals by the gate signal conversion unit 130. For example, the gate signal conversion unit 130 is configured to be able to receive a carrier having a predetermined carrier frequency from a carrier generation unit. The gate signal conversion unit 130 compares the magnitude relationship between the carrier and the three-phase voltage commands Vu, Vv, and Vw. Then, the gate signal conversion unit 130 generates U-phase switching signals Gup and Gun, V-phase switching signals Gvp and Gvn, and W-phase switching signals Gwp and Gwn as switching signals having logical states that change in accordance with the comparison result. The generated switching signal of each phase is input to the inverter 20. Then, when the inverter 20 is changed to or maintained in the driving state of each switching element defined by the corresponding phase switching signal, the motor 30 is driven in accordance with the circuit state corresponding to the driving state. The control mode of the inverter 20 is one mode of PWM control. Further, among the switching signals corresponding to the respective phases, the signal to which the identifier "p" is assigned is a drive signal for driving the p-side switching element among the switching elements of the respective phases, and the signal to which the identifier "n" is assigned is a drive signal for driving the n-side switching element among the switching elements of the respective phases.

The voltage command corrector 140 corrects the three-phase voltage commands Vu, Vv, and Vw output from the current control unit 120. The voltage command corrector 140 performs correction to add a predetermined correction component to the three-phase voltage commands (Vu, Vv, Vw) output from the current control unit 120.

In the control device 40 configured as described above, the inverter control unit 100 performs switching between the normal control in which the correction is not performed by the voltage command corrector 140 and the correction control in which the correction is performed by the voltage command corrector 140.

For example, when a ripple of a component of a frequency that is a multiple of the electric frequency occurs in the power supply current of the DC power supply 10, the voltage command corrector 140 performs correction to add a component (correction component) for canceling out the ripple to the voltage commands That is, examples of the execution condition of the correction control include a case where the power supply current ripple including a component of a frequency that is a multiple of the electric frequency occurs. The control device 40 can detect the occurrence of a ripple in the power supply current based on signals input from various sensors. The component of a frequency that is a multiple of the electric frequency includes a component of the 6n-th order of the power supply current. As described above, the control device 40 performs the correction control for correcting the voltage commands by the voltage command corrector 140 as the ripple reduction control for reducing a ripple that occurs in the motor drive system 50.

With respect to the configuration of the voltage command corrector 140, according to the knowledge of the inventors, it has become clear that the 6n-th order ripple of the power supply current can be reduced by performing correction of adding a (6n−1)-th order distortion component and a (6n+1)-th order distortion component to the voltage commands of the inverter 20. As described above, parameters correlated with the input voltage to the motor 30 include the power supply current. Furthermore, since each order component is an independent phenomenon, when a ripple having a plurality of components occurs, distortions corresponding to components of the respective orders can be added and the resultant can be added to the voltage commands. That is, a distortion superimposing unit of each order is added in accordance with components of orders to be reduced.

The voltage command corrector 140 includes a (6n−1)-th order distortion superimposing unit 141 and a (6n+1)-th order distortion superimposing unit 142, where n is a natural number (n=1, 2, 3, . . . ).

The electric (6n−1)-th order distortion superimposing unit 141 performs correction to add an electrical (6n−1)-th order distortion component to the voltage commands. The electric (6n+1)-th order distortion superimposing unit 142 performs correction to add an electrical (6n+1)-th order distortion component to the voltage commands. To both of the (6n−1)-th order distortion superimposing unit 141 and the (6n+1)-th order distortion superimposing unit 142, the amplitude and the phase are input. Regarding the amplitude and the phase, the control device 40 determines the amplitude and the phase by, for example, an estimation method (theoretical calculation) using an inverter-motor model. This theoretical calculation may be online calculation or offline calculation. Then, the (6n−1)-th order distortion superimposing unit 141 and the (6n+1)-th order distortion superimposing unit 142 each determine the correction value of the corresponding phase based on the input amplitude and phase. The voltage command corrector 140 outputs the determined correction value of each phase (a correction component of the voltage command).

Then, the correction values of the phases output from the voltage command corrector 140 are added to respective ones of the three-phase voltage commands (Vu, Vv, Vw) output from the current control unit 120. As described above, when the control device 40 executes the correction control (ripple reduction control) of the voltage commands, the corrected three-phase voltage commands obtained by adding the correction component are input to the gate signal conversion unit 130. The gate signal conversion unit 130 generates switching signals of the respective phases of the inverter 20 based on the corrected three-phase voltage commands.

Here, an occurrence mechanism of the power supply current ripple will be described with reference to FIGS. 2 to 5. In this description, in the electric circuit of the motor drive system 50, the motor 30 side with respect to the inverter 20 is referred to as an "AC side", and the DC power supply 10 side with respect to the inverter 20 is referred to as a "DC side". In addition, the occurrence mechanism illustrated in FIG. 2 has become clear by the knowledge of the inventors.

Figure 2:
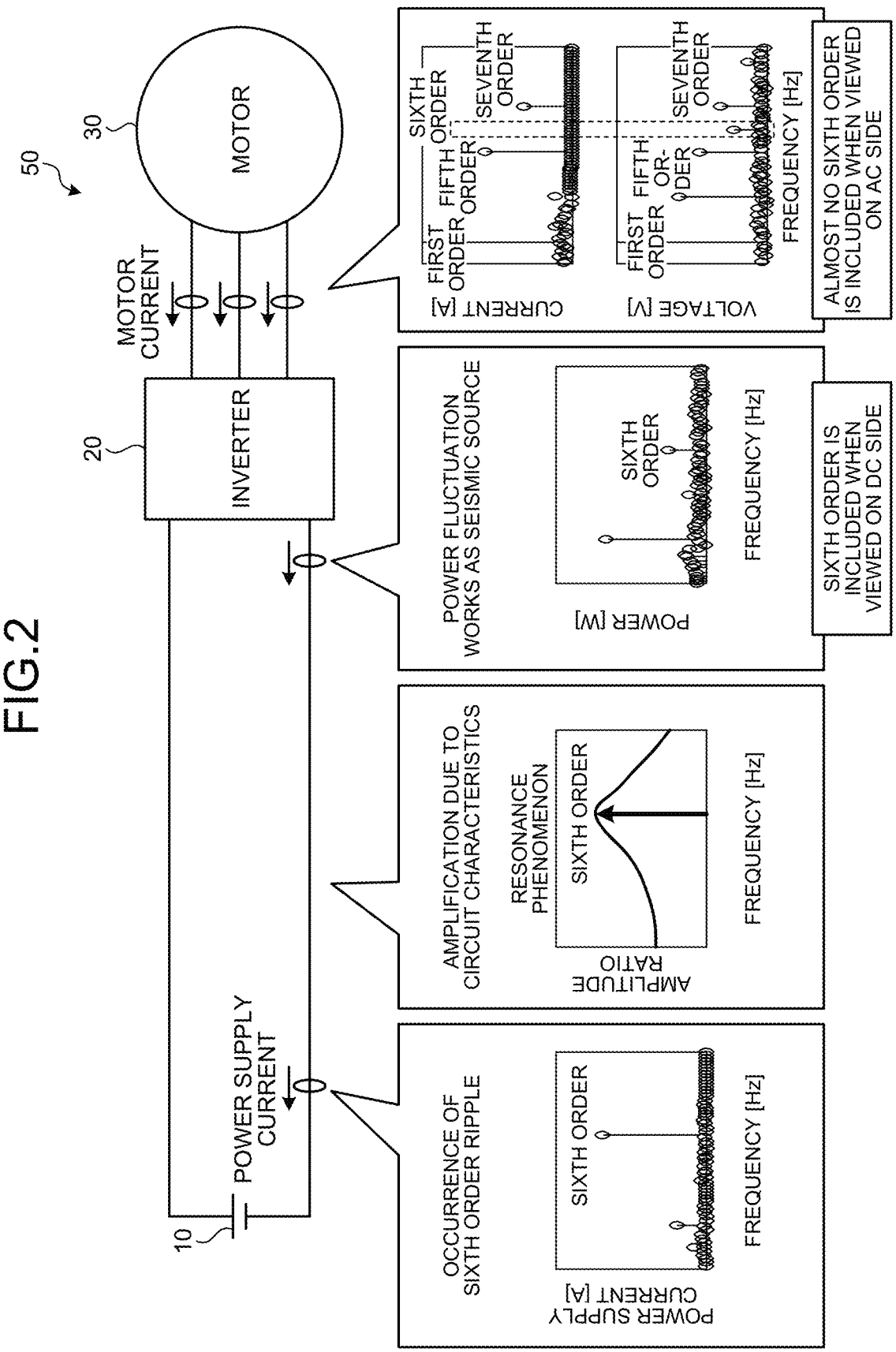
FIG. 2 is a diagram for describing the occurrence mechanism of the power supply current ripple.

FIG. 2 is a diagram for describing the occurrence mechanism of the power supply current ripple. As illustrated in FIG. 2, it was found that the current and the voltage include almost no sixth order component when viewed on the AC side. Instead, it was found that the current and the voltage on the AC side include both of the fifth order component and the seventh order component.

On the other hand, when viewed on the DC side, the power includes the sixth order component. The power on the DC side is based on the current and the voltage on the AC side. That is, it has become clear that the fifth order distortion and the seventh order distortion on the AC side become the sixth order component on the DC side. As described above, according to the knowledge of the inventor, it has become clear that the 6n-th order component on the DC side becomes the (6n+1)-th order component and the (6n−1)-th order component when viewed on the AC side (voltage, current, magnetic flux) due to the properties of the trigonometric function.

Figure 3:
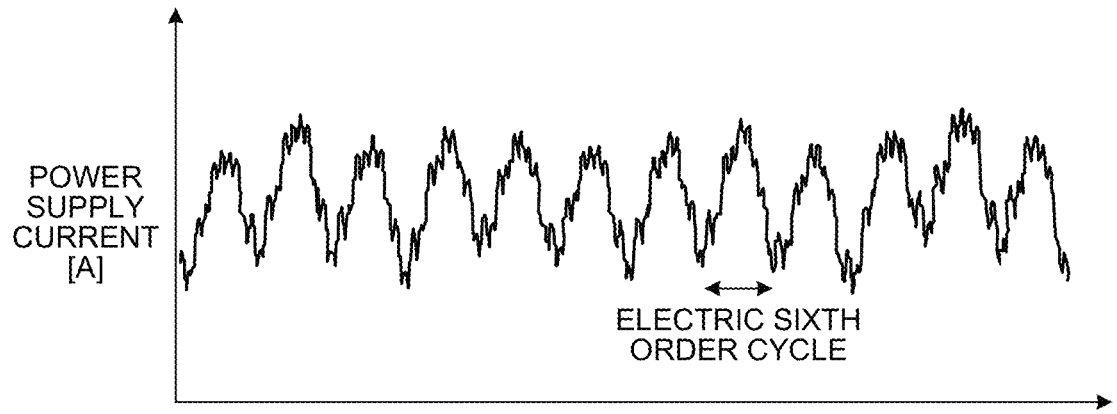
FIG. 3 is a waveform diagram illustrating a sixth order ripple of the power supply current.

In addition, on the DC side, the sixth order component of the electric frequency is amplified due to the circuit characteristics. The ripple component is amplified by the resonance phenomenon of the smoothing capacitor or the inductance of the wiring. As a result, as illustrated in FIG. 3, the electric sixth order component (electric sixth order cycle) is dominant in the power supply current ripple. As described above, according to the knowledge of the inventors, it has become clear that on the DC side, the power fluctuation works as the seismic source, and thus the sixth order ripple occurs in the power supply current. That is, it is considered that if the power fluctuation on the DC side can be suppressed, the 6n-th order ripple of the power supply current can be reduced.

Figure 4:
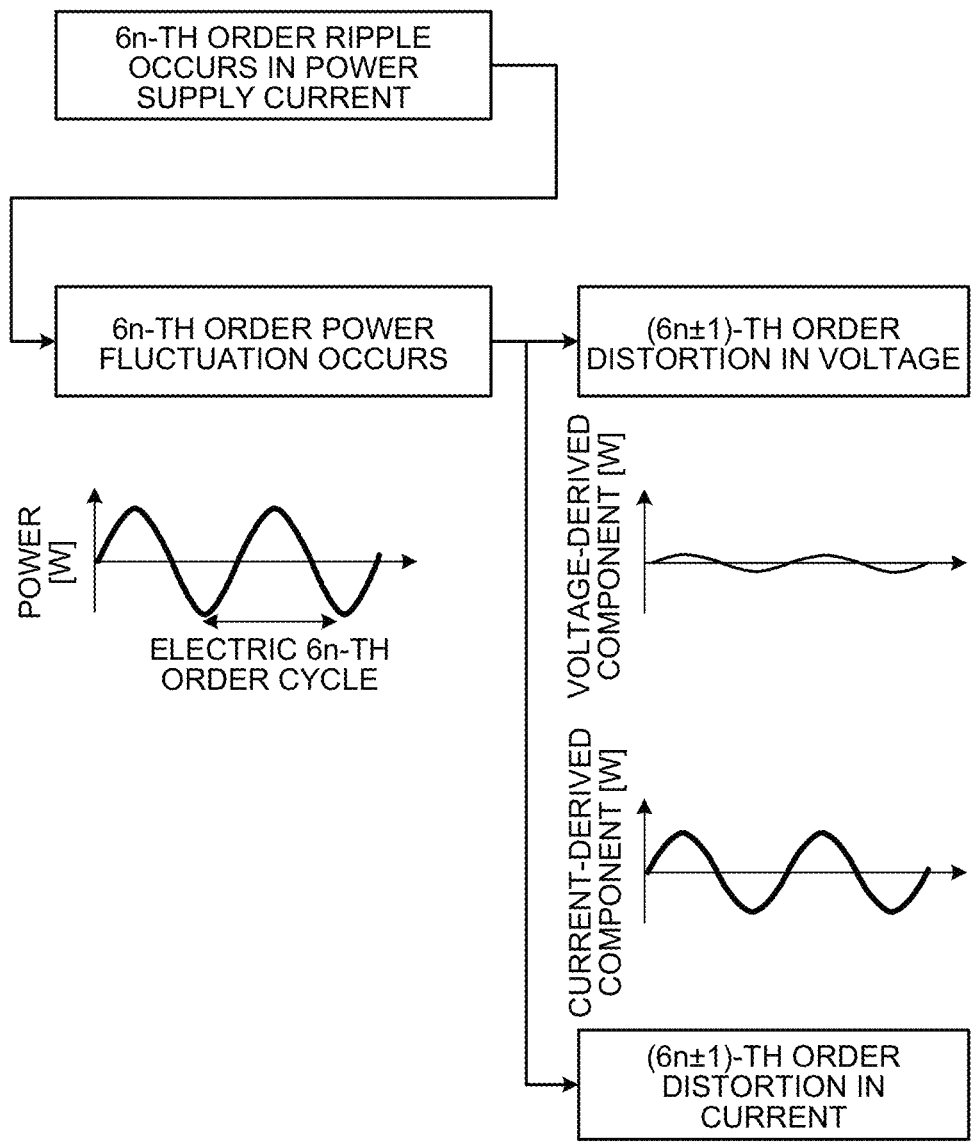
FIG. 4 is a diagram for describing power fluctuation on a DC side.

FIG. 4 is a diagram for describing power fluctuation on the DC side. As illustrated in FIG. 4, when 6n-th order ripple occurs in the power supply current, 6n-th order fluctuation (6n-th order power fluctuation) occurs in the power on the DC side. This power fluctuation on the DC side can be divided into distortion of a voltage-derived component and distortion of a current-derived component. Furthermore, the power on the DC side is determined by the voltage and current on the AC side. Therefore, considering the occurrence mechanism illustrated in FIG. 2, the 6n-th order power fluctuation on the DC side is determined by the (6n−1)-th order component and the (6n+1)-th order component in the voltage on the AC side and the (6n−1)-th order component and the (6n+1)-th order component in the current on the AC side. That is, the distortion of the voltage-derived component in the 6n-th order power fluctuation on the DC side is due to the (6n−1)-th order distortion and the (6n+1)-th order distortion in the voltage on the AC side. The distortion of the current-derived component in the 6n-th order power fluctuation on the DC side is due to the (6n−1)-th order distortion and the (6n+1)-th order distortion in the current on the AC side.

When the magnitude of distortion is compared between the voltage-derived component and the current-derived component, it can be seen that the distortion of the voltage-derived component is relatively small and the distortion of the current-derived component is relatively large. From this result, the 6n-th order power fluctuation on the DC side is mainly caused by distortion of the current-derived component. That is, it is considered that the cause of the occurrence of the 6n-th order ripple in the power supply current is the (6n−1)-th order distortion and the (6n+1)-th order distortion in the current on the AC side.

Figure 5:
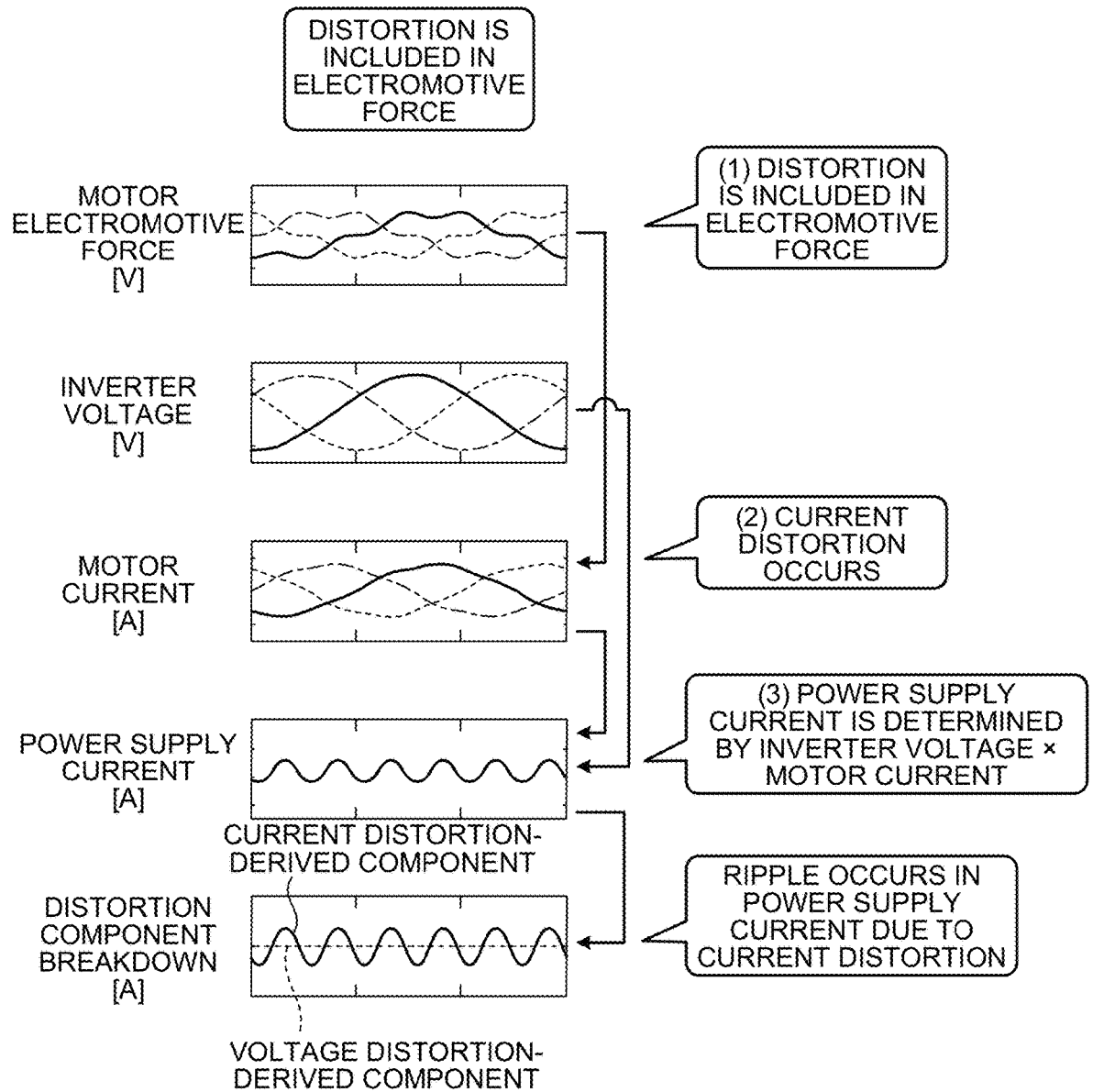
FIG. 5 is a diagram for describing the cause of distortion in the motor current.

FIG. 5 is a diagram for describing the cause of distortion in the motor current. As illustrated in FIG. 5, distortion occurs in the motor electromotive force on the AC side. Even when distortion does not occur in the inverter voltage, distortion occurs in the motor electromotive force. The distortion in the motor electromotive force causes distortion in the motor current on the AC side. In addition, the current flows back from the AC side to the DC side by the switching control in the inverter 20. As described with reference to FIGS. 2 and 4, the distortion in the power supply current on the DC side is determined by the inverter voltage and the motor current on the AC side. Therefore, as illustrated in FIG. 5, distortion (ripple) of the power supply current on the DC side occurs due to distortion in the motor current on the AC side.

Figure 6:
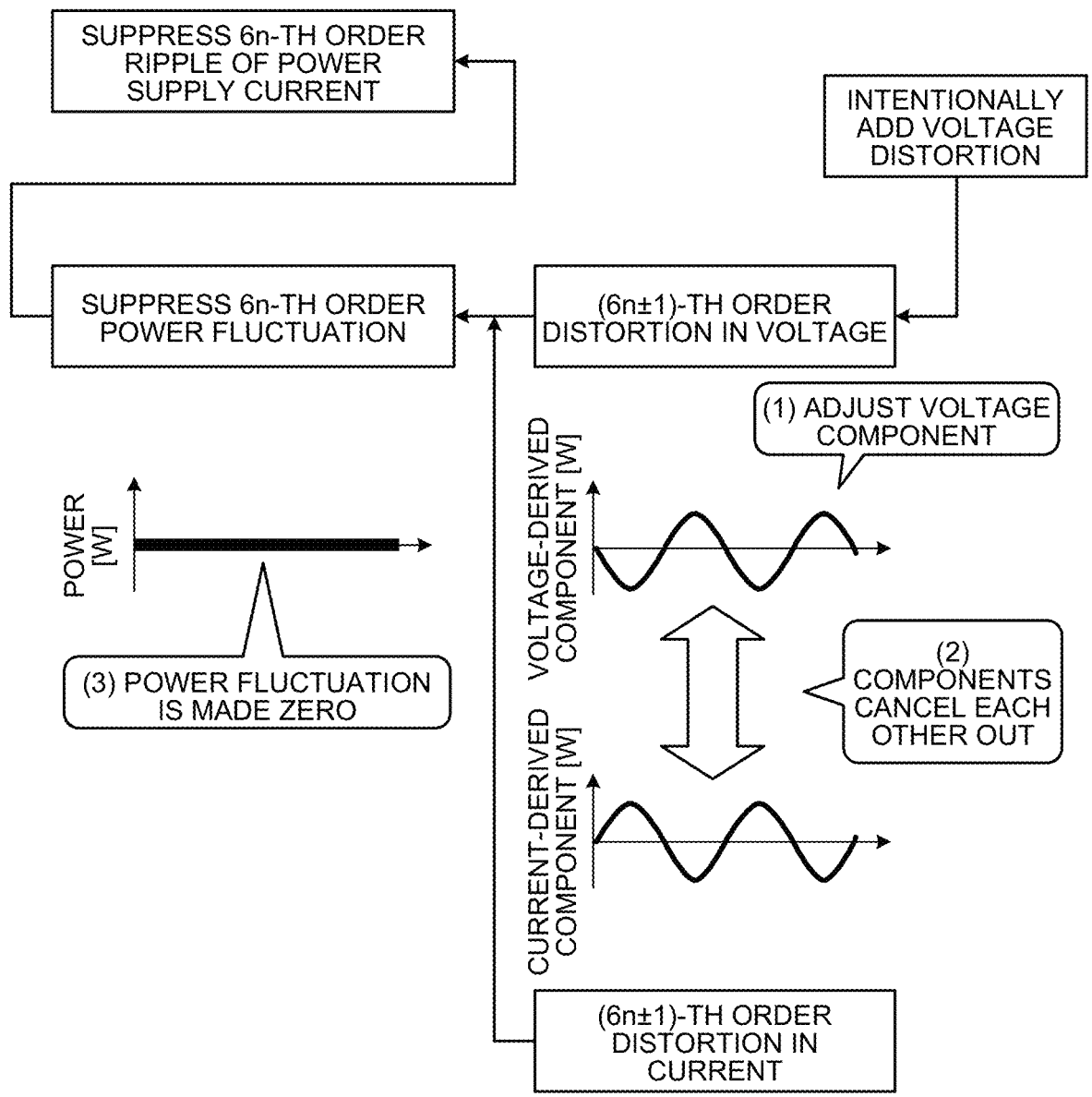
FIG. 6 is an explanatory diagram illustrating a countermeasure against the power supply current ripple.

Therefore, as a countermeasure against the power supply current ripple, the control device 40 is configured to suppress power fluctuation on the DC side as illustrated in FIG. 6. That is, it is considered that if the 6n-th order power fluctuation in the power on the DC side can be suppressed, the 6n-th order ripple of the power supply current can be reduced. Therefore, according to the knowledge of the inventors and focusing on the voltage-derived component of power, a method of suppressing power fluctuation by adjusting this voltage component has been conceived.

Specifically, as illustrated in FIG. 6, the control device 40 intentionally adds voltage distortion. In this way, the voltage component is adjusted to have a waveform in a desired state. At that time, control is performed so as to adjust the fluctuation of the voltage-derived component in the power fluctuation while keeping the fluctuation of the current-derived component without being adjusted. Then, the distortion of the current-derived component and the distortion of the adjusted voltage-derived component cancel each other out, so that it is possible to suppress the 6n-th order power fluctuation on the DC side. As described above, the adjusted voltage-derived component cancels out the fluctuation of the current-derived component, whereby the power fluctuation on the DC side can be even made zero.

Figure 7:
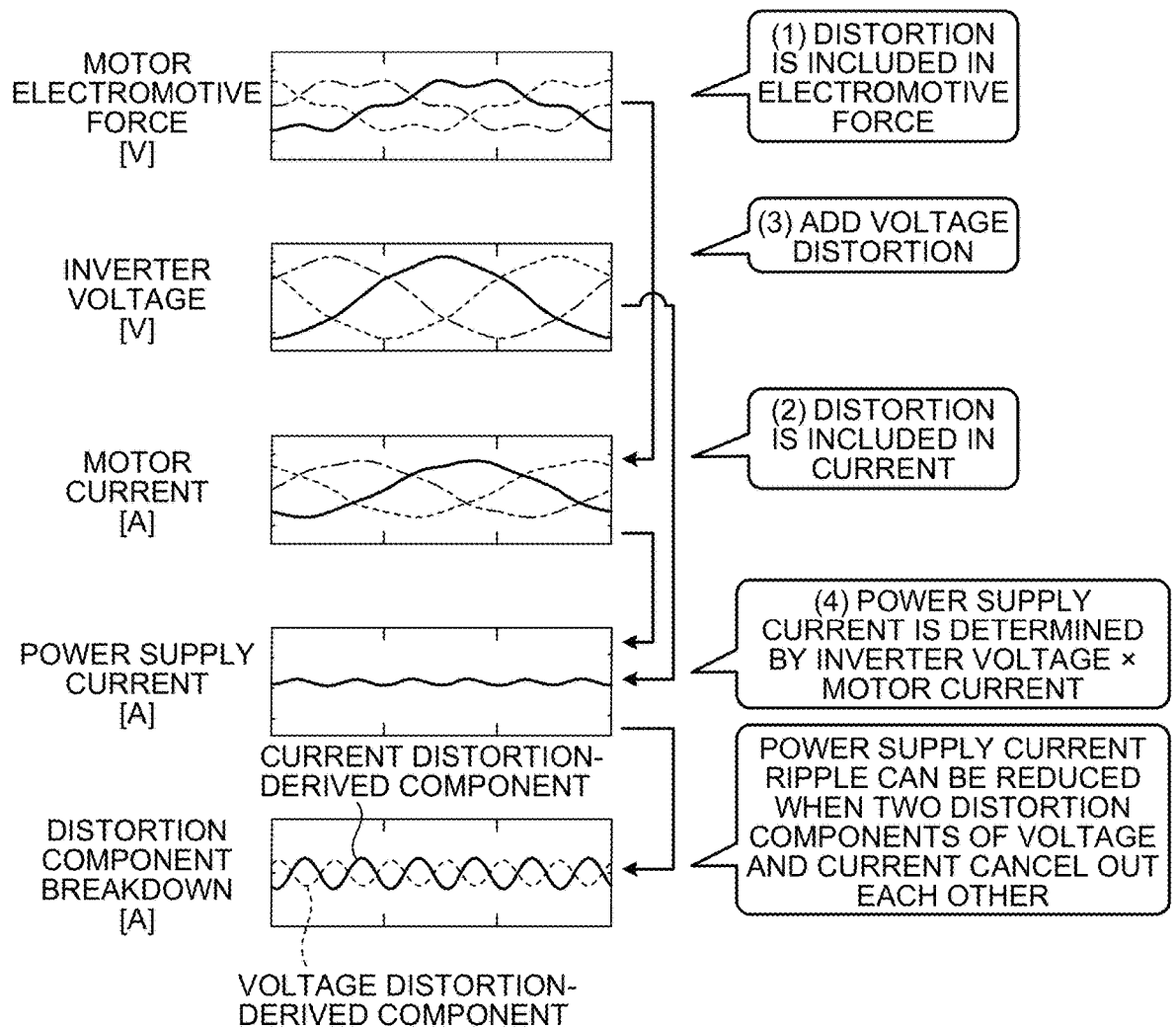
FIG. 7 is a diagram for describing a waveform when distortion is intentionally added to the inverter voltage as a countermeasure against the power supply current ripple.

FIG. 7 is a diagram for describing a waveform when distortion is intentionally added to the inverter voltage as a countermeasure against the power supply current ripple. As illustrated in FIG. 7, when distortion occurs in the motor current due to distortion in the motor electromotive force, in order to reduce the power supply current ripple caused by the current distortion-derived component, the control device 40 performs correction control of the voltage commands to intentionally add distortion to the inverter voltage. The distortion component added to the inverter voltage is a component adjusted so as to be able to cancel out the current distortion-derived component among the components of the power supply current. When distortion is added to the inverter voltage by this correction control, distortion remains in the motor current. That is, the control device 40 does not add a distortion component that completely cancels out the distortion in the motor current to the inverter voltage, but adds a distortion component that works as a voltage distortion-derived component that cancels out the current distortion-derived component of the power fluctuation to the inverter voltage.

Figure 8:
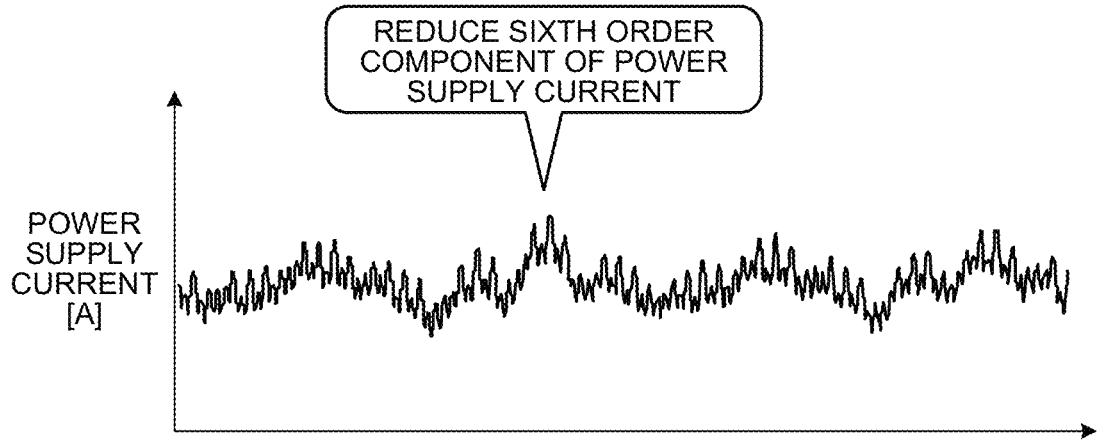
FIG. 8 is a waveform diagram illustrating a waveform of the power supply current when correction control is performed.

For example, in a case where a sixth order ripple occurs in the power supply current, in the voltage command corrector 140, the (6n−1)-th order distortion superimposing unit 141 performs correction to add a fifth order distortion to each phase voltage command as a correction component, and the (6n+1)-th order distortion superimposing unit 142 performs correction to add a seventh order distortion to each phase voltage command as a correction component. A fifth order distortion component and a seventh order distortion component are superimposed on the voltage command. Therefore, the corrected voltage commands include a fifth order distortion component and a seventh order distortion component. Then, a gate signal of each phase switching element is generated based on the corrected voltage command, and the inverter 20 is controlled. The corrected inverter voltage has a switching width that has been changed as compared with the inverter voltage without correction. That is, when the voltage commands are corrected, the duty ratio is changed so that the switching width is changed. Then, when the control device 40 performs correction control of adding distortions of the fifth order component and the seventh order component to the voltage commands, the sixth order component of the power supply current can be reduced as illustrated in FIG. 8.

As described above, the inverter control unit 100 of the control device 40 controls the voltage command of each phase to control the input voltage to the motor 30. Then, in a case where a predetermined high frequency component is included in a parameter correlated with the input voltage to the motor 30, the inverter control unit 100 performs correction control on the voltage commands to perform correction to add a component that cancels out the high frequency component to the input voltage. The high frequency component is a 6n-th order component. That is, the ripple includes an electric sixth order component and an electric twelfth order component. Therefore, as illustrated in FIG. 1, the voltage command corrector 140 includes a (6m−1)-th order distortion superimposing unit 143 and a (6m+1)-th order distortion superimposing unit 144, where m is a natural number based on n (m=n+1, n+2, n+3, . . . ).

For example, in a case where the sixth order ripple and the twelfth order ripple of the power supply current are reduced, n=1 and m=2. Therefore, the (6n−1)-th order distortion superimposing unit 141 adds a distortion of the fifth order component, the (6n+1)-th order distortion superimposing unit 142 adds a distortion of the seventh order component, the (6m−1)-th order distortion superimposing unit 143 adds a distortion of the eleventh order component, and the (6m+1)-th order distortion superimposing unit 144 adds a distortion of the thirteenth order component.

As described above, according to the embodiment, it is possible to reduce the 6n-th order ripple of the power supply current without taking hardware countermeasures against the electrical distortion in the inverter 20 and the motor 30. That is, the present technique is applicable to the motor drive system 50, which is general, without hardware change, and thus is excellent in versatility.

Note that the electric vehicle 1 is not limited to a hybrid vehicle, and may be an electric car using only the motor 30 as a power source or a train (railway vehicle) equipped with the motor 30. The motor 30 may be any three-phase AC motor, and the motor 30 is not limited to a PM motor and may be an induction motor (IM).

The motor drive system 50 may include a boost converter and a smoothing capacitor. The boost converter includes a reactor, a switching element, and a diode. The smoothing capacitor is a smoothing capacitor connected between the positive electrode line and the negative electrode line. In this case, the current flowing through the reactor of the boost converter and the voltage between the terminals of the smoothing capacitor are detected by various sensors. In a case where a smoothing capacitor is provided as described above, reduction of the power supply current by the correction control of the voltage commands can downsize the smoothing capacitor. In addition, the control device 40 includes a converter control unit that controls a driving state of the boost converter.

The method of determining the amplitude and the phase of the voltage command corrector 140 is not limited to theoretical calculation. That is, as a method of determining the amplitudes and the phases of the correction values, any method such as a method of feeding back sensor values for learning or a method of drawing a result of tuning in advance on a map may be used. For example, in the method of feeding back sensor values, the amplitude and the phase, at which the sixth order component becomes smaller is measured on the DC side.

In addition, when the sixth order ripple occurs in the power supply current, the voltage command corrector 140 may be configured to perform correction to add at least one of the fifth order distortion or the seventh order distortion to each phase voltage command. That is, the correction is not limited to the correction of adding both the fifth order distortion and the seventh order distortion, and may be correction of adding only one of the fifth order distortion or the seventh order distortion.

In addition, the control device 40 is not limited to be configured to execute ripple reduction control (correction control) for reduction the power supply current ripple but for reduction of the motor torque ripple. The control device 40 of this modification executes correction control for correcting voltage commands as a countermeasure against the motor torque ripple. An execution condition of the correction control in this modification is when a motor torque ripple occurs. That is, parameters correlated with the input voltage to the motor 30 include the motor torque. The control device 40 can detect the occurrence of a ripple in the motor torque based on signals input from various sensors. The motor torque ripple includes a component that is a multiple of the electric frequency. The component of a frequency that is a multiple of the electric frequency includes a component of the 6n-th order. Then, when a 6n-th order ripple occurs in the motor torque, the control device 40 executes correction control for correcting the voltage commands in order to reduce the motor torque ripple. Here, the modification will be described in more detail with reference to FIGS. 9 to 10.

Figure 9:
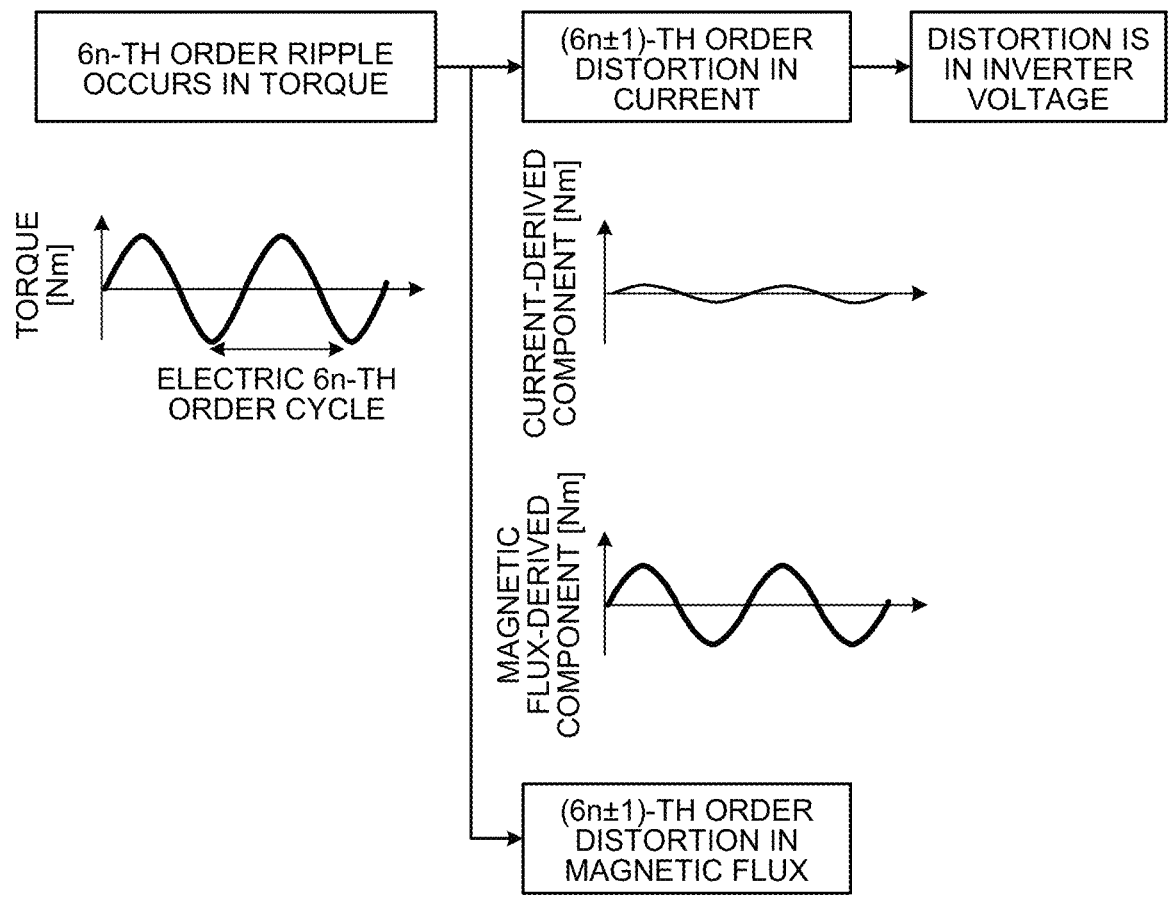
FIG. 9 is a diagram for describing the motor torque ripple.

FIG. 9 is a diagram for describing the motor torque ripple. As illustrated in FIG. 9, when the motor torque ripple occurs, the 6n-th order ripple occurs in the motor torque. The motor 30 is an interior permanent magnet synchronous motor (IPMSM). Therefore, the torque equation of the IPMSM is expressed by the following equation (1).

$$T = P\phi Iq + P(Lq - Ld)IdIq \quad (1)$$

In the above equation (1), P is the number of poles, $\phi$ is the magnetic flux of a magnet, Iq is the q-axis current, Lq is the inductance, Ld is the inductance, and Id is the d-axis current. Further, $P\phi Iq$ represents the magnet torque. $P(Lq-Ld)IdIq$ represents the reluctance torque. In this modification, only the magnet torque is considered as a cause of the motor torque ripple. The same applies to the case of including the reluctance torque.

Figure 10:
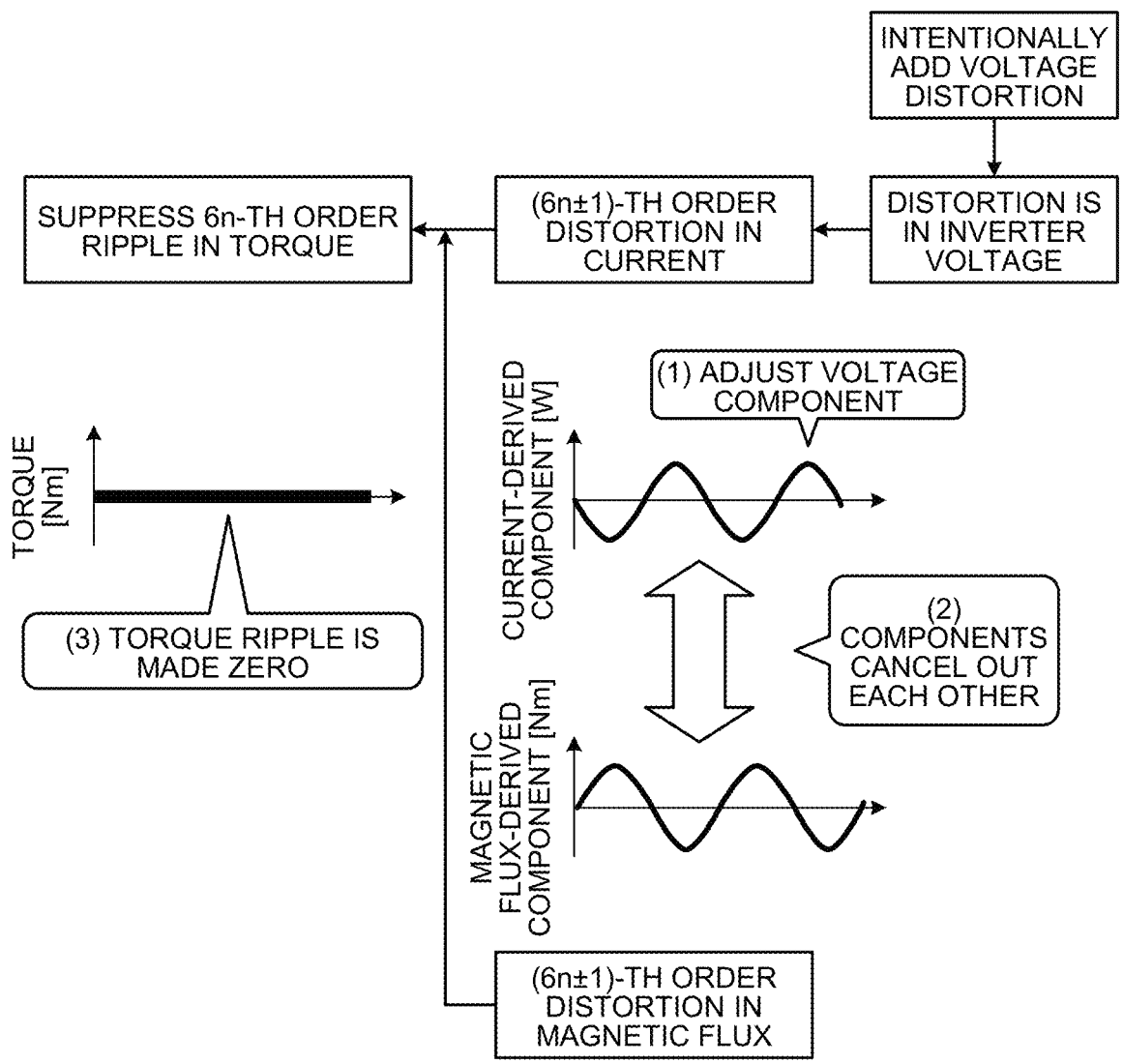
FIG. 10 is an explanatory diagram illustrating a countermeasure against the motor torque ripple.

As expressed by the above equation (1), the motor torque is determined by the motor current and the magnetic flux. The motor torque ripple can be divided into distortion of a current-derived component and distortion of a magnetic flux-derived component. Therefore, as illustrated in FIG. 9, the 6n-th order ripple of the motor torque is determined by the (6n−1)-th order component and the (6n+1)-th order component of the current and the (6n−1)-th order component and the (6n+1)-th order component of the magnetic flux. The distortion in the motor current is caused by the distortion in the inverter voltage. That is, the (6n−1)-th order distortion and the (6n+1)-th order distortion in the current are caused by distortion in the inverter voltage. Therefore, the control device 40 of the modification executes correction control of intentionally adding voltage distortion by adjusting a (6n−1)-th order component and a (6n+1)-th order component of the current as illustrated in FIG. 10, as a countermeasure against the motor torque ripple. According to this modification, the 6n-th order ripple of the motor torque can be suppressed, and the torque ripple can be even made zero.

Alternatively, as another modification, the control device 40 may be configured to switchingly perform the power supply current ripple reduction control or the motor torque ripple reduction control. In the method of correcting the voltage commands to reduce the power supply current ripple and the motor torque ripple, it is necessary to consider mutual interference. Therefore, in this modification, the control to be prioritized is switched in accordance with the operating point (torque, rotation speed) of the motor 30. Here, the other modification will be described in more detail with reference to FIGS. 11 to 12.

Figure 11:
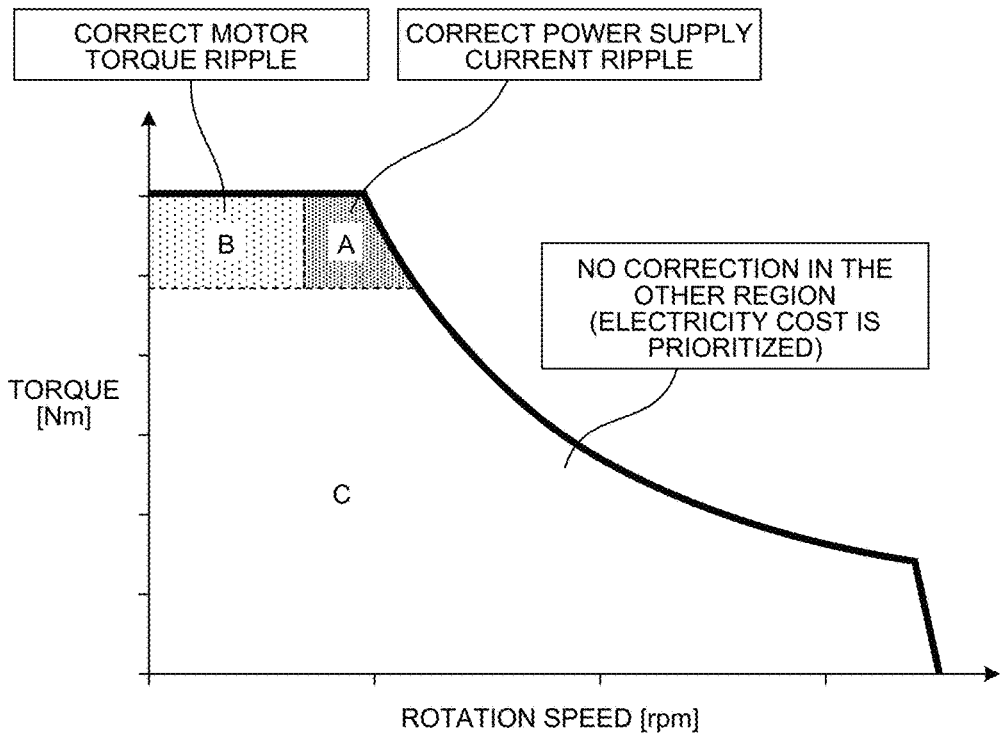
FIG. 11 is a map diagram for describing that the correction control is switched in accordance with the operating point of the motor.

FIG. 11 is a map diagram for describing that the correction control is switched in accordance with the operating point of the motor. As illustrated in FIG. 11, when the motor torque is higher than a predetermined value, the control device 40 performs the ripple reduction control. When the rotation speed is relatively high in the high torque region, that is, when the operating point is within the region A illustrated in FIG. 11, the control device 40 performs the power supply current ripple reduction control. On the other hand, when the rotation speed is relatively low in the high torque region, that is, when the operating point is within the region B illustrated in FIG. 11, the control device 40 performs the motor torque ripple reduction control. When the motor torque is smaller than the predetermined value, that is, when the operating point is within the region C illustrated in FIG. 11, the control device 40 does not perform the ripple reduction control. Note that the regions and boundaries illustrated in FIG. 11 are examples, and the regions and boundaries are not limited thereto.

Figure 12:
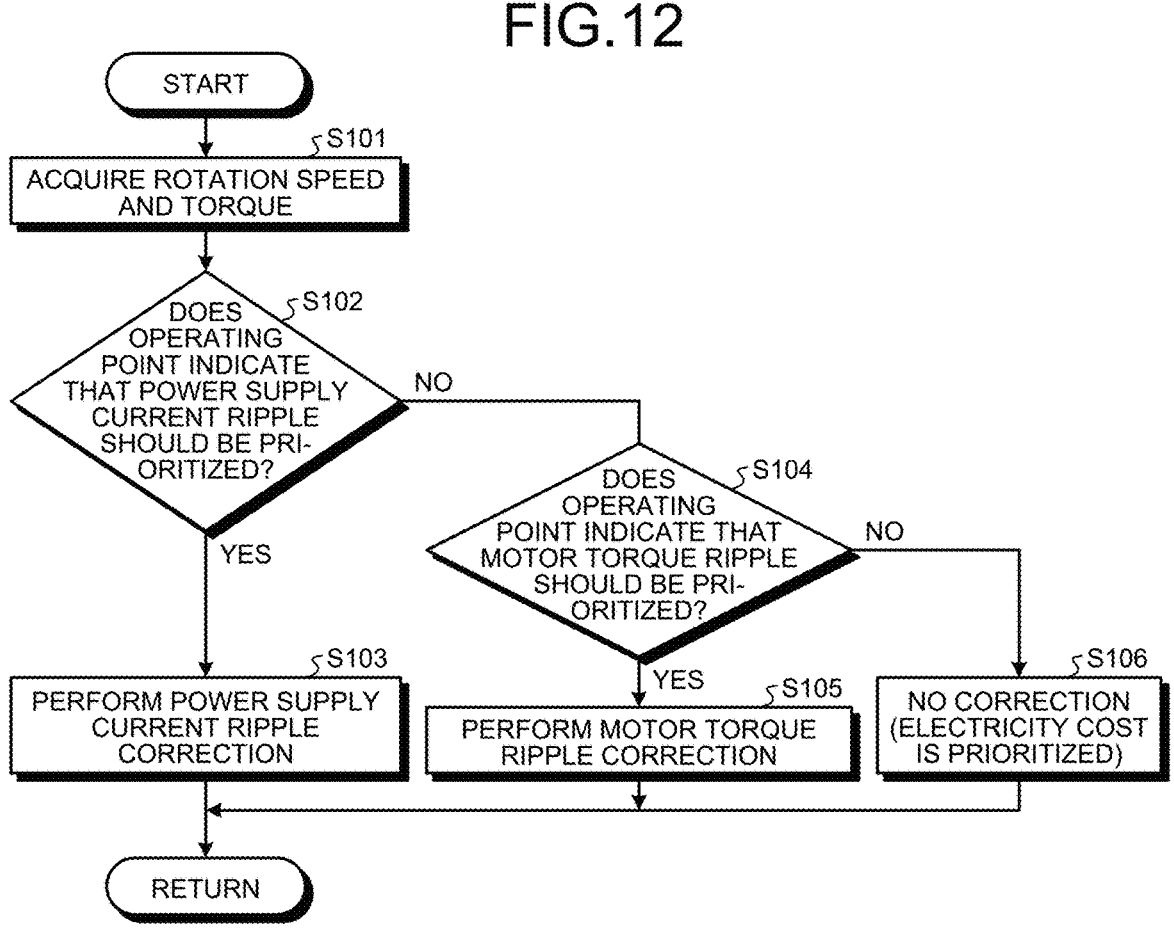
FIG. 12 is a flowchart illustrating a switching processing flow.

FIG. 12 is a flowchart illustrating a switching processing flow. Note that the control illustrated in FIG. 12 is repeatedly performed in each control cycle by the control device 40.

The control device 40 acquires information on the rotation speed and torque of the motor 30 (step S101). In step S101, the operating point of the motor 30 is acquired. The control device 40 calculates the rotation speed of the motor 30 based on the rotational position of the motor 30 input from the rotational position sensor. As the torque of the motor 30, the required torque calculated based on the accelerator opening and the vehicle speed can be used.

The control device 40 determines whether the operating point of the motor 30 is in the region A where reduction of the power supply current ripple is prioritized (step S102). In step S102, it is determined whether to prioritize the countermeasure against the power supply current ripple using the map illustrated in FIG. 11 and the operating point acquired in step S101.

When the operating point of the motor 30 is within the region A where reduction of the power supply current ripple is prioritized (step S102: Yes), the control device 40 performs correction control for reducing the power supply current ripple (step S103). In step S103, the voltage commands are corrected as the power supply current ripple reduction control. When the processing of step S103 is performed, this control routine ends.

When the operating point of the motor 30 is not within the region A where reduction of the power supply current ripple is prioritized (step S102: No), the control device 40 determines whether the operating point of the motor 30 is within the region B where reduction of the motor torque ripple is prioritized (step S104). In step S104, it is determined whether to prioritize the countermeasure against the motor torque ripple using the map illustrated in FIG. 11 and the operating point acquired in step S101.

When the operating point of the motor 30 is within the region B where reduction of the motor torque ripple is prioritized (step S104: Yes), the control device 40 performs correction control for reducing the motor torque ripple (step S105). In step S105, the voltage commands are corrected as the motor torque ripple reduction control. When the processing of step S105 is performed, this control routine ends.

When the operating point of the motor 30 is not in the region B where reduction of the motor torque ripple is prioritized (step S104: No), the control device 40 does not correct the voltage command and prioritizes the electricity cost (step S106). Step S106 is performed when it is determined that the operating point is in the region C using the map illustrated in FIG. 11 and the operating point in step S101. The control device 40 performs normal control. When the processing of step S106 is performed, this control routine ends.

As in the other modification, the control device 40 switches between the first correction control for performing correction so as to cancel out only the 6n-th order component of the power supply current out of the power supply current and the motor torque and the second correction control for performing correction so as to cancel out only the 6n-th order component of the motor torque in accordance with the operating point of the motor 30. That is, parameters correlated with the input voltage to the motor 30 may include at least one of the power supply current or the motor torque.

Note that the map illustrated in FIG. 11 is an example, and the relationship between the motor operating point and regions where the control is performed is not limited thereto. That is, the relationship between the region A in which the reduction of the power supply current ripple is prioritized, the region B in which the reduction of the motor torque ripple is prioritized, and the region C in which the correction control is not performed is not limited to the example illustrated in FIG. 11.

Furthermore, according to a related-art technique, the ripple of the switching frequency component can be reduced by the countermeasure against the power supply voltage ripple, but the countermeasure against the high frequency iron loss is not considered, so that a component of a frequency that is multiple of an electric frequency is not reduced, and there is room for improvement. In the motor drive system 50 the distortion in the inverter voltage, the current of the motor 30, and the magnetic flux may cause the 6n-th order distortion to occur in the magnetic flux, and then cause high frequency iron loss. Therefore, as a still another modification, the control device 40 may perform correction control for correcting the voltage commands as a countermeasure against the high frequency iron loss. An execution condition of the correction control in this modification is when distortion occurs in the magnetic flux. That is, parameters correlated with the input voltage to the motor 30 include the magnetic flux. The control device 40 can detect the occurrence of distortion in the magnetic flux based on signals input from various sensors. The distortion in the magnetic flux includes a component that is a multiple of the electric frequency. The component of a frequency that is a multiple of the electric frequency includes a 6n-th order component. When the 6n-th order component of the distortion occurs in the magnetic flux, the control device 40 executes correction control for correcting the voltage commands in order to reduce the distortion in the magnetic flux. As described above, the control device 40 is not limited to be configured to execute distortion reduction control (correction control) for reduction of the power supply current ripple and the motor torque ripple but also for reduction of the 6n-th order component of the distortion in the magnetic flux. Here, this modification will be described in more detail with reference to FIGS. 13 to 14.

Figure 13:
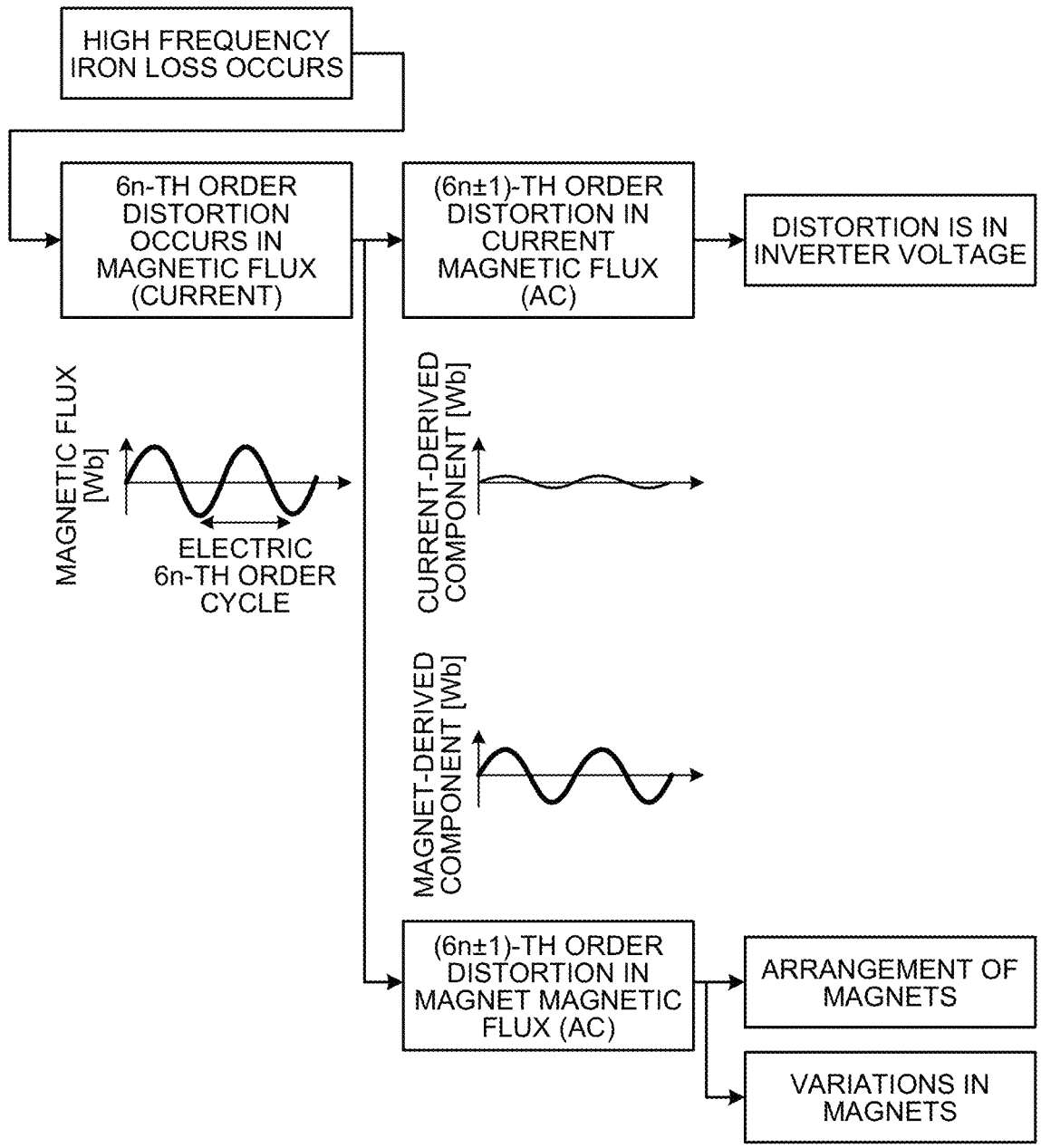
FIG. 13 is a diagram for describing distortion in the magnetic flux.

FIG. 13 is a diagram for describing distortion in the magnetic flux. As illustrated in FIG. 13, when high frequency iron loss occurs, 6n-th order distortion occurs in the magnetic flux on the DC side. The magnetic flux on the DC side is determined by the current magnetic flux and the magnet magnetic flux on the AC side. The distortion in the magnetic flux on the DC side can be divided into distortion of a current magnetic flux-derived component and distortion of a magnet magnetic flux-derived component. Therefore, considering the occurrence mechanism illustrated in FIG. 13, the 6n-th order distortion in the magnetic flux on the DC side is determined by the (6n−1)-th order component and the (6n+1)-th order component in the current magnetic flux on the AC side and the (6n−1)-th order component and the (6n+1)-th order component in the magnet magnetic flux on the AC side.

Figure 14:
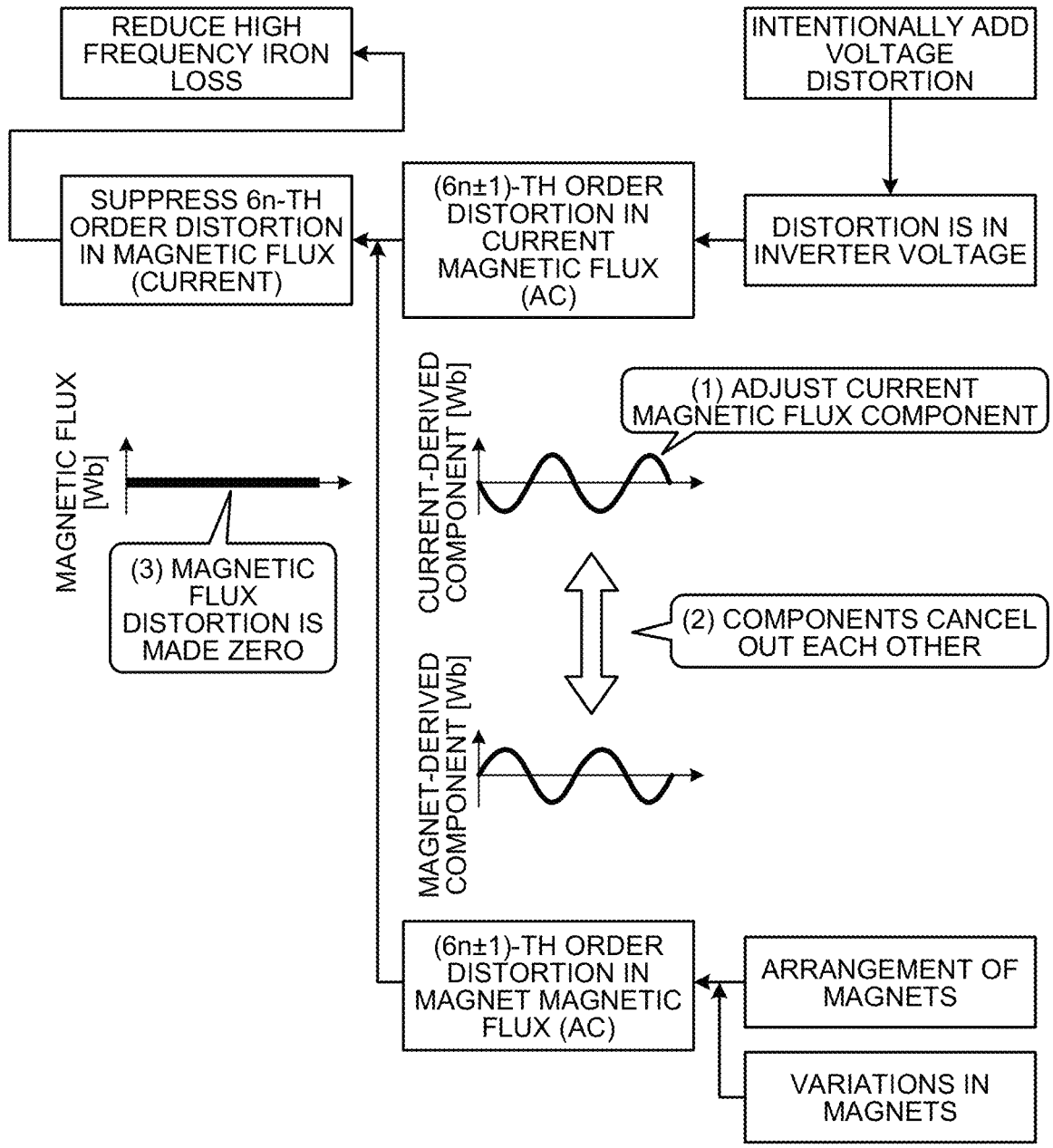
FIG. 14 is a diagram for describing a countermeasure against the high frequency iron loss.

The distortion in the current magnetic flux on the AC side is caused by the distortion in the inverter voltage. That is, the (6n−1)-th order distortion and the (6n+1)-th order distortion in the current magnetic flux on the AC side are caused by distortion in the inverter voltage. In addition, the distortion in the magnet magnetic flux on the AC side is caused by arrangement of magnets and variations in magnets, and that is, is determined by the configuration of the motor 30. Therefore, the control device 40 is configured to, as a countermeasure against the high frequency iron loss, intentionally add voltage distortion as illustrated in FIG. 14 to suppress the 6n-th order distortion in the magnetic flux on the DC side.

Specifically, the control device 40 performs correction control of intentionally adding voltage distortion by adjusting a (6n−1)-th order component and a (6n+1)-th order component of the current magnetic flux on the AC side. At that time, control is performed so as to adjust the distortion of the current magnetic flux-derived component in the distortion in the magnetic flux while keeping the distortion of the magnet magnetic flux-derived component without being adjusted. Then, the distortion of the magnet magnetic flux-derived component and the distortion of the adjusted current magnetic flux-derived component cancel each other out, so that it is possible to suppress the 6n-th order distortion in the magnetic flux on the DC side. According to the modification, the current magnetic flux-derived component on the AC side after the adjustment cancels out the distortion of the magnet magnetic flux-derived component, whereby the distortion in the magnetic flux on the DC side can be even made zero. By suppressing the distortion in the magnetic flux of on the DC side as described above, the high frequency iron loss can be reduced. Thus, the high frequency iron loss is reduced, so that the efficiency of the motor drive system 50 (system efficiency) can be improved. That is, it is possible to reduce the high frequency iron loss without taking hardware countermeasures against the electrical distortion in the inverter 20 and the motor 30.

Alternatively, as still another modification, the control device 40 may be configured to switchingly perform reduction control of the magnetic flux distortion or the normal control in which correction is not performed. In the method of correcting voltage commands to reduce the power supply current ripple, the motor torque ripple, and the magnetic flux distortion, it is necessary to consider mutual interference. Therefore, in this modification, the control to be prioritized is switched in accordance with the operating point (torque, rotation speed) of the motor 30. Here, this modification will be described in more detail with reference to FIG. 15.

Figure 15:
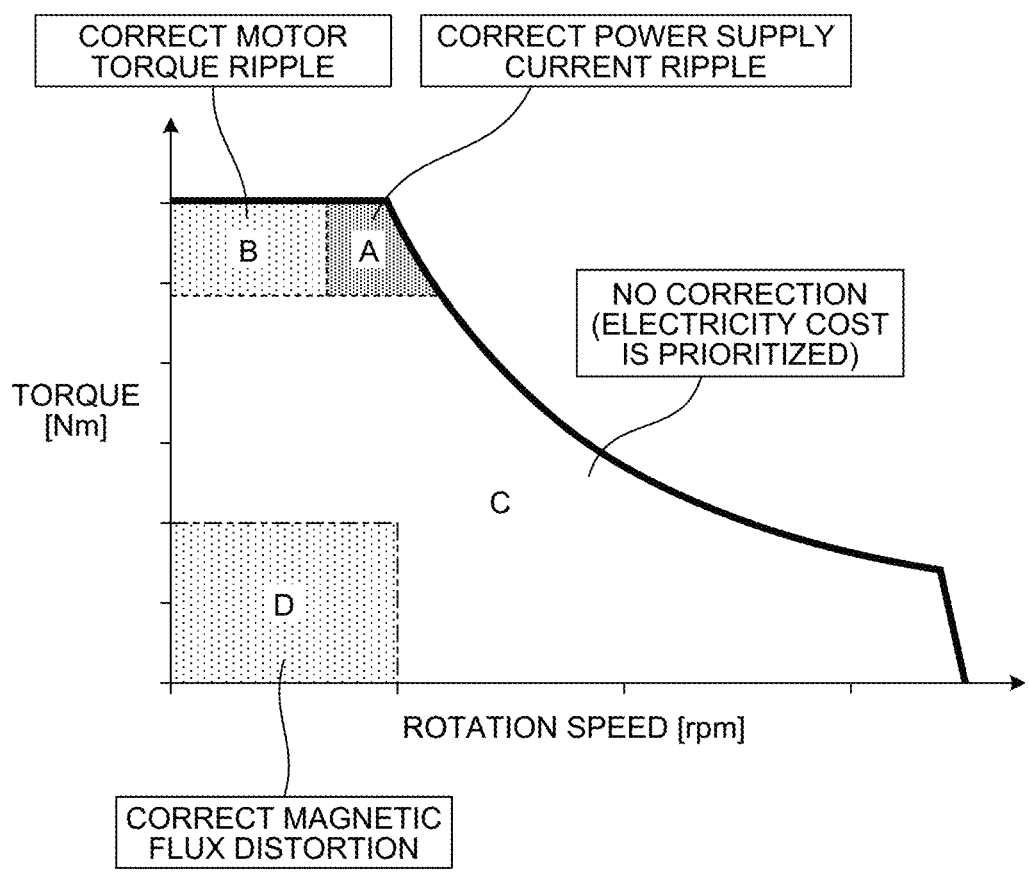
FIG. 15 is a map diagram for describing that the correction control is performed on the magnetic flux in accordance with the operating point of the motor.

FIG. 15 is a map diagram for describing that the correction control on the magnetic flux is performed in accordance with the operating point of the motor. As illustrated in FIG. 15, when the motor torque is lower than a second predetermined value and the motor rotation speed is lower than a third predetermined value, the control device 40 performs the reduction control of the magnetic flux distortion. That is, when the motor 30 is in the low torque region and in the low rotation speed region, that is, the operating point is in a region D illustrated in FIG. 15, the control device 40 performs the reduction control of the magnetic flux distortion. When the operating point of the motor 30 is in a region C illustrated in FIG. 15, the control device 40 performs the normal control in which correction is not performed. The normal control is control for prioritizing the electricity cost over reduction of the ripple or the distortion. In this way, the control device 40 switches, in accordance with the operating point of the motor 30, between a third correction control for performing correction so as to cancel out only the 6n-th order component of the magnetic flux on the DC side and the normal control in which correction is not performed. Thus, it is possible to achieve, in accordance with the state of the motor 30, both reduction of the high frequency iron loss by performing the third correction control and assurance of efficiency by performing the normal control.

Furthermore, in this modification, the control device 40 can switch, in accordance with the operating point of the motor 30, between the first correction control for performing correction so as to cancel out only the 6n-th order component of the power supply current out of the power supply current, the motor torque, and the magnetic flux, the second correction control for performing correction so as to cancel out only the 6n-th order component of the motor torque out of the power supply current, the motor torque, and the magnetic flux, the third correction control for performing correction so as to cancel out only the 6n-th order component of the magnetic flux on the DC side out of the power supply current, the motor torque, and the magnetic flux, and the normal control in which correction is not performed. That is, parameters correlated with the input voltage to the motor 30 may include at least one of the power supply current, the motor torque, or the magnetic flux on the DC side. In this case, in the high torque region, when the rotation speed is relatively high, that is, the operating point is in a region A illustrated in FIG. 15, the control device 40 performs the reduction control of the power supply current ripple, and when the rotation speed is relatively low, that is the operating point is in a region B illustrated in FIG. 15, the control device 40 performs the reduction control of the motor torque ripple. Thus, it is possible to avoid interference between the control for reducing the power supply current ripple, the control for reducing the motor torque ripple, and the control for reducing the high frequency iron loss. Note that the regions and boundaries illustrated in FIG. 15 are examples, and the regions and boundaries are not limited thereto.

According to the present disclosure, in a case where a predetermined high frequency component is included in a parameter correlated with the input voltage to the three-phase AC motor, correction to add a component that cancels out the high frequency component to the input voltage is performed, whereby the component of a frequency that is multiple of an electric frequency can be reduced.

According to an embodiment, in a case where a predetermined high frequency component is included in a parameter correlated with the input voltage to the three-phase AC motor, correction to add a component that cancels out the high frequency component to the input voltage is performed, whereby the component of a frequency that is multiple of the electric frequency can be reduced.

According to an embodiment, it is possible to take a countermeasure against the 6n-th order component ripple of the parameter.

According to an embodiment, by adjusting the (6n−1)-th order component and the (6n+1)-th order component on the AC side, the 6n-th order component ripple of the parameter can be reduced.

According to an embodiment, it is possible to take countermeasures against the power supply current ripple and the motor torque ripple, and it is possible to simultaneously achieve a plurality of objects demanded for the control device.

According to an embodiment, since a first correction control and a second correction control are switched and performed, it is possible to avoid interference between the control for reducing the power supply current ripple and the control for reducing the motor torque ripple.

According to an embodiment, the distortion in the magnetic flux can be suppressed, so that the high frequency iron loss is reduced. Thus, the high frequency iron loss is reduced to improve the system efficiency.

According to an embodiment, in accordance with the state of the motor, the correction control and the normal control are switched and performed. Thus, it is possible to achieve both reduction of the distortion in the magnetic flux and assurance of efficiency.

According to an embodiment, it is possible to take countermeasures against the power supply current ripple, the motor torque ripple, and the high frequency iron loss, and it is possible to simultaneously achieve a plurality of objects demanded for the control device.

According to an embodiment, the first correction control, the second correction control, and the third correction control are switched and performed. Thus, it is possible to avoid interference between the control for reducing the power supply current ripple, the control for reducing the motor torque ripple, and the control for reducing the high frequency iron loss.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device for an electric vehicle, comprising:
    a DC power supply;
    a three-phase AC motor;
    an inverter that converts DC power supplied from the DC power supply into AC power and outputs the AC power to the three-phase AC motor; and
    a control unit that controls the inverter to control an input voltage to the three-phase AC motor, wherein
    when a parameter correlated with the input voltage includes a predetermined high frequency component, the control unit performs correction of adding a component for canceling out the high frequency component to the input voltage, and controls the three-phase AC motor based on the corrected input voltage.

2. The control device for an electric vehicle according to claim 1, wherein
    the high frequency component is a 6n-th order component.

3. The control device for an electric vehicle according to claim 2, wherein
    the component that cancels out the high frequency component includes at least one of a (6n−1)-th order component or a (6n+1)-th order component.

4. The control device for an electric vehicle according to claim 2, wherein
    the parameter includes at least one of a power supply current or a motor torque.

5. The control device for an electric vehicle according to claim 4, wherein
    the control device switches, in accordance with an operating point of the three-phase AC motor, between first correction control of performing the correction so as to cancel out only the 6n-th order component of the power supply current out of the power supply current and the motor torque, and second correction control of performing the correction so as to cancel out only the 6n-th order component of the motor torque out of the power supply current and the motor torque.

6. The control device for an electric vehicle according to claim 2, wherein the parameter includes a magnetic flux.

7. The control device for an electric vehicle according to claim 6, wherein the control device switches, in accordance with an operating point of the three-phase AC motor, between correction control of performing the correction so as to cancel out the 6n-th order component of the magnetic flux and normal control in which the correction is not performed.

8. The control device for an electric vehicle according to claim 2, wherein the parameter includes at least one of the power supply current, the motor torque, and the magnetic flux.

9. The control device for an electric vehicle according to claim 8, wherein the control device switches, in accordance with an operating point of the three-phase AC motor, among first correction control of performing the correction so as to cancel out only the 6n-th order component of the power supply current out of the power supply current, the motor torque, and the magnetic flux, second correction control of performing the correction so as to cancel out only the 6n-th order component of the motor torque out of the power supply current, the motor torque, and the magnetic flux, and third correction control of performing the correction so as to cancel out only the 6n-th order component of the magnetic flux out of the power supply current, the motor torque, and the magnetic flux.

* * * * *